Jan. 17, 1928.
C. W. HALL
1,656,193
AIRPLANE
Filed April 19, 1926
2 Sheets-Sheet 1
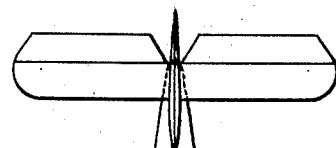
Fig. 1.
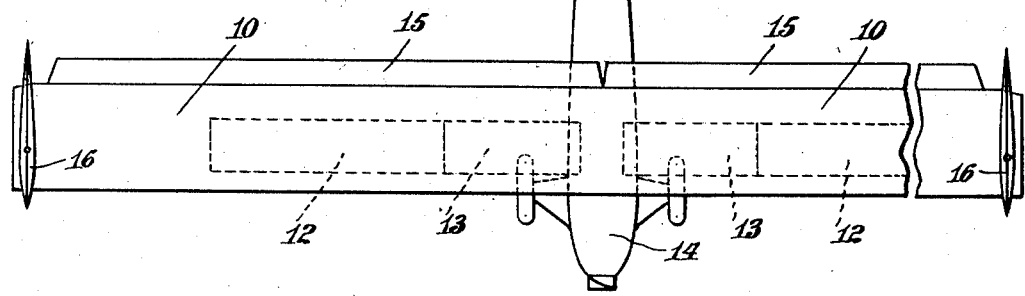
Fig. 2.
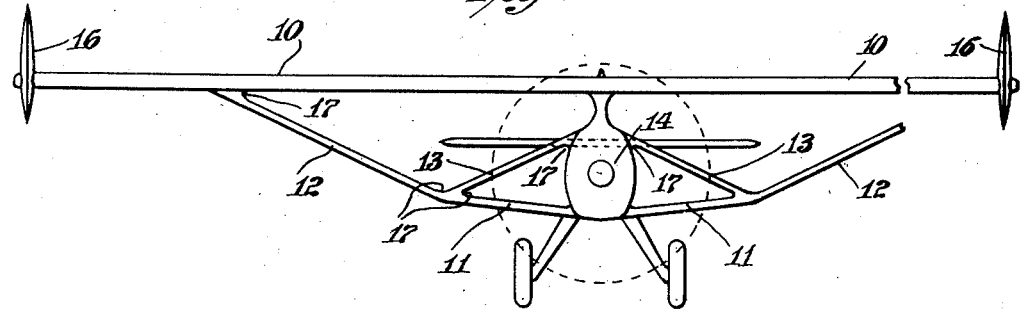
Fig. 3.
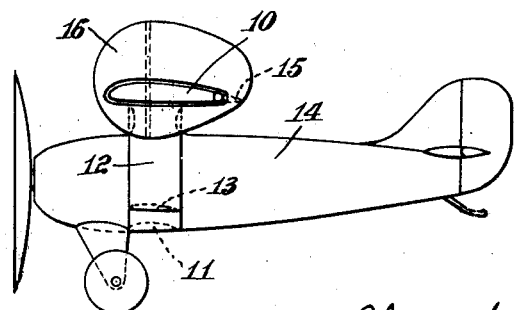
Charles Ward Hall
INVENTOR
BY J. B. Whitney
ATTORNEY Jan. 17, 1928.
C. W. HALL
1,656,193
AIRPLANE
Filed April 19, 1926     2 Sheets-Sheet 2
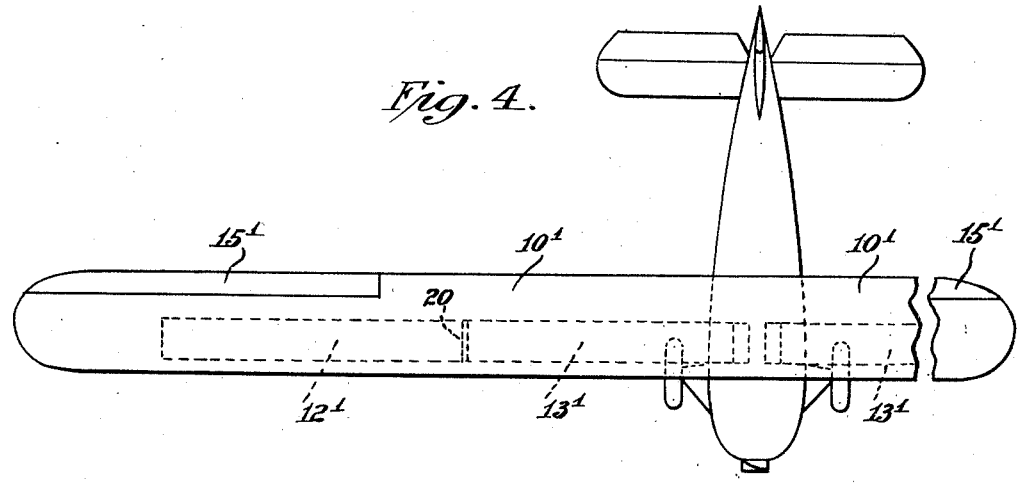
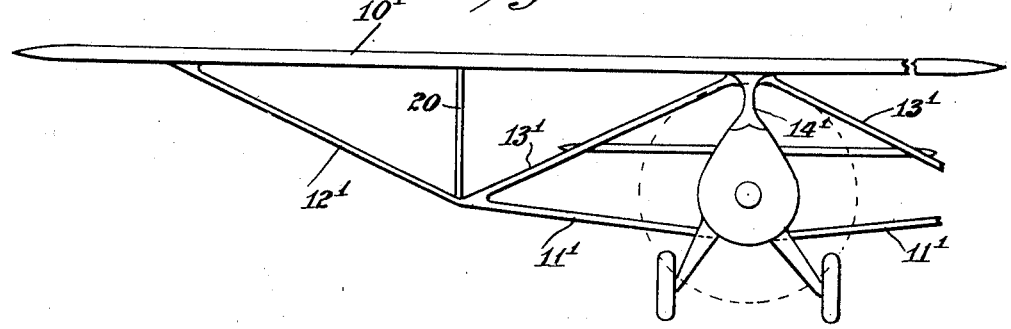
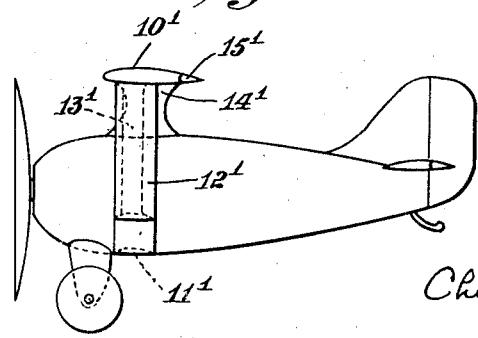
Charles Ward Hall
INVENTOR
BY W. B. Whitney
ATTORNEY Patented Jan. 17, 1928.

1,656,193

UNITED STATES PATENT OFFICE.

CHARLES WARD HALL, OF LARCHMONT, NEW YORK.

AIRPLANE.

Application filed April 19, 1926. Serial No. 102,903.

This invention relates to airplanes, and particularly to machines of the sesqui-plane type, and the object thereof is to provide a wing cellule, of novel type and possessing novel aerodynamic characteristics, which will give increased efficiency to such machines.

It is known that the induced drag of a wing varies inversely as the aspect ratio, which is defined as the ratio of wing area to the span squared, within the usual range of angle of attack from high speed at sea level to climb nearly to service ceiling. It increases in any usual case with increase of the lift co-efficient, but at a much slower rate when the aspect ratio is high.

While aerodynamically most efficient, an unbraced monoplane wing of medium camber is extremely heavy if the aspect ratio is more than five or six, the bending stresses being large in proportion to the area and the depth being relatively shallow. If very thick wing sections are used the drag, particularly at high speed, is increased unduly and if the usual bracing, as in a bi-plane, is used to gain truss depth with additional span the parasite resistance of the bracing offsets the lower induced drag of the wing itself. For this reason, with bi-planes, a practical limit of about eight and one-half is consistent with the current best practice for aspect ratio, although aspect ratios as high as twelve have been built with disappointing results. Tapering in plan form and in thickness has, to a limited extent, the effect of increased aspect ratio; but this is an expensive method for attaining the desired end and, moreover, is limited in practice to a moderate degree since the wing tips become unduly flexible.

If, therefore, a wing can be built as though a monoplane of high aspect ratio, and given a depth by bracing equivalent to a bi-plane, the bracing being a lifting section quite or nearly as efficient as the main wing, and made still more efficient through the elimination of loss from the wing tip vortices a nearly ideal cellule may be realized.

My new wing cellule comprises, broadly stated, an upper wing, which for economy is preferably of uniform section with rounded tips but may be tapered in plan form and height, and a lower wing with chord materially less—preferably about fifty percent to thirty-five per cent—that of the upper wing, which through the central or middle portion of its length approximately parallels the upper wing and then without change of aerofoil form is inclined upwardly so as to meet, and is joined to, the upper wing, preferably at about one to one and one-half chord lengths, from the tip of the latter in a multi-bay machine or at about two-thirds of the span of a single bay machine.

By this lower wing arrangement I eliminate the fairly large tip losses of the usual lower wings, which amount frequently to forty-five to fifty percent of the whole, substituting therefor a comparatively slight drag due to interference at the jointure of the two wings. The lower wing is adversely affected by such interference for only a very small portion of the span close to the jointure, while as for the upper wing the obstruction on its lower surface will, as is usual whenever the flow over this surface is retarded by any means, improve its circulation and hence its lift. Furthermore, the lower wing, in addition to the elimination of its tip losses, has in the outer panel a large dihedral which assures sufficient transverse stability without impairment of maneuverability. I thus obtain all the efficiency of a partially braced monoplane, but with far less parasite drag and considerably less weight; while the unusually large lift-drag ratio of the cellule at medium and high angles of attack, equal to that of an internally braced monoplane of the same aspect ratio, assures an ample reserve of power for maneuverability, climb, and ceiling.

Further, by mounting near the tips of the upper wing a lateral control system of the type described in Letters Patent No. 1,287,297, issued to me under date of December 10, 1918, not only may the tip vortex losses for this wing be practically eliminated, as in the case of the lower wing, but the induced drag of the entire cellule is made to approximate that for infinite aspect ratio. In this case and inasmuch as the efficiency of this type of lateral control is un-affected by burbling at high angles of attack (unlike the usual ailerons wherewith at near stalling angles an increase of aileron angle produces a reversed effect on bank and turn,) wing flaps may be used to great advantage for improving the speed range. The adaptation here is for trailing edge flaps, capable of adjustment between each other to a very limited extent but essentially operated simultaneously on both sides of the wing to practically the same angle, the range of such operation being from approximately eight degrees above the chord to approximately seventy-five degrees below the chord. The effect of this combination is to increase the speed range of an airplane with any given aerofoil beyond the limits practicable with differential or aileron type trailing edge flaps, both because the control at low speed is not limited by ailerons and because the usual tip losses of both upper and lower wings are substantially eliminated.

The permissible span of a wing between supports is primarily a structural problem. For aerofoils having a maximum depth of twelve to thirteen percent of the chord length, this unsupported span is commonly one and one-half to one and three-fourths chords but with the refined type of structure covered by my earlier patents and pending applications for patents it has been found possible to employ economically unsupported spans of two and three-fourths to three and one-half chord lengths for like aerofoils.

The invention is shown, by way of illustration and not of limitation, in the accompanying drawings, in which—

Figs. 1, 2 and 3 are views of an airplane, in plan and in front and in side elevation respectively, illustrating one practical embodiment of my present improvements, and Figs. 4, 5 and 6 are corresponding views of an airplane illustrating an embodiment of the same improvements in somewhat modified form.

Referring first to Figs. 1-3, 10 indicates the upper wing of the airplane, 11 and 12 indicate the inner horizontal, or nearly horizontal, and outer inclined section of the lower wing, on each side of the fuselage 14, and 13 indicates an inclined wing-strut by which each lower wing is braced at the angle therein to the top of the fuselage. The upper wing, with an aspect ratio of nine and unsupported span of three chord lengths, is provided with trailing edge flaps 15 extending substantially the entire length thereof, by which the camber of the wing may be adjusted to varying flying conditions, and at each end with a vertically disposed streamlined fin 16 which, preferably as here shown, encircles the wing and is pivotally mounted thereon to swing to a limited extent about a vertical axis located somewhat to the rear of its center of pressure and hence will function, or can be made to function, in the manner of the vertical stabilizing fin shown and described in my earlier Patent No. 1,287,297. The chord both of the lower wings and of the inclined wing-struts is here one-half that of the upper wing, and the upper and lower wings and the wing-struts are of similar aerofoil section, which is uniform throughout their length. The wings and wing-struts may be of any suitable construction, but in practice I prefer an all metal structure, with framework of light spar and rib trusses and a structural skin covering of smooth duralumin sheet, in which the two wings, the two panels of each lower wing, and the wing-strut are so joined as to afford both beam and skin continuity with filleted connections, as indicated at 17, between the skin of the different parts at their points of jointure.

In the airplane illustrated in Figs. 4-6, the unsupported span of the upper wing 10', provided as shown with usual ailerons 15', is three chord lengths as before, but its aspect ratio has been increased to fifteen. The chord of the lower wing sections 11' 12' are here approximately two-fifths that of the upper wing, and the chord of the inclined wing-strut 13', which here braces each lower wing at the angle therein to the upper wing and the top 14' of the fuselage, is still further reduced. Each lower wing is further connected, at the angle therein, to the upper wing by a stream-lined strut 20, which divides the single bay of the upper wing on each side of the fuselage and so allows of its greater aspect ratio, with corresponding improvement in climb and ceiling, at the expense of so little parasite drag in the cellule as to affect the maximum speed of the machine scarcely at all. The construction here is preferably substantially the same as that already described.

It has been found that an airplane, having an aspect ratio of ten and one-fourth, constructed with wing cellules substantially as described will climb at the rate of about 750 feet per minute on leaving the ground and has a ceiling of somewhat over 15,000 feet, as compared with a climbing rate of about 650 feet per minute and a ceiling of not over 12,000 feet in the case of a corresponding airplane of any ordinary construction. It has, moreover, an exceptionally flat gliding angle.

The invention may be further modified in its several parts, or these parts may be differently combined or some of the parts may be used without the others, without departing from the spirit or sacrificing the advantages thereof.

What I claim as new, and desire to secure by Letters Patent, is—

1. In an airplane, a wing cellule comprising upper and lower wings of aerofoil section in which the lower wing, with chord materially less than that of the upper wing, extends substantially parallel thereto through the inner portion of its length and then without change of aerofoil section is inclined upwardly to meet and is joined to the upper wing short of its tips.

2. In an airplane, a wing cellule comprising an upper wing of substantially uniform aerofoil section throughout and a lower wing, with chord materially less than that of the upper wing and also of substantially uniform aerofoil section throughout, having an inner panel which more or less parallels the upper wing and an upwardly inclined outer panel which at its outer end contacts with and is joined to the upper wing somewhat short of its tip.

3. In an airplane, a wing cellule comprising an upper wing of substantially uniform aerofoil section throughout and a lower wing, with chord approximately one-half that of the upper wing and also of substantially uniform aerofoil section throughout, which through the inner portion of its length substantially parallels the upper wing and then extends upwardly at an incline to and is connected with the upper wing short of the tips thereof, the two wings and the two portions of the lower wing having beam and skin continuity at the points of jointure.

4. In an airplane, the combination, with a fuselage, of a wing cellule comprising an upper wing, a lower wing with chord materially less than that of the upper wing which through the inner portion of its length nearly parallels the upper wing and then is inclined upwardly at an angle to meet and is joined to the upper wing, and an inclined wing-strut also with chord materially less than that of the upper wing which connects the lower wing at or near the angle therein with the top of the fuselage.

5. In an airplane, the combination, with a fuselage, of an upper wing, a lower wing which through the inner portion of its length substantially parallels, and then is inclined upwardly to meet and is joined to, the upper wing, and an inclined wing-strut which connects the lower wing at or near the angle therein with the upper wing over the fuselage, the wings and wing-strut having similar aerofoil sections which are substantially uniform throughout their length and the lower wing and wing-strut having a chord little if any more than one-half that of the upper wing.

6. In an airplane, a wing cellule comprising upper and lower wings in which the upper wing has at each end a fin pivotally mounted to turn to a limited extent about a vertical axis located to the rear of its center of pressure and the lower wing, with chord materially less than that of the upper wing, extends substantially parallel thereto through the inner portion of its length and then is inclined upwardly to meet and is joined to the upper wing short of the outer ends thereof.

7. In an airplane, a wing cellule comprising upper and lower wings in which the upper wing has at each end a fin mounted to swing to a limited extent about a vertical axis located to the rear of its center of pressure and is provided with a trailing edge flap extending substantially the length thereof and the lower wing, with chord materially less than that of the upper wing, extends substantially parallel thereto through the inner portion of its length and then without change of aerofoil section is inclined upwardly to meet and is joined to the upper wing at points somewhat short of the outer ends thereof.

CHARLES W. HALL.